June 16, 1942.  O. SANDLIN  2,286,650

MACHINE FOR PLUCKING POULTRY AND THE LIKE

Filed Nov. 23, 1940

WITNESS
F. J. Hartman.

INVENTOR
Otis Sandlin.
BY
ATTORNEY

Patented June 16, 1942

2,286,650

UNITED STATES PATENT OFFICE 2,286,650

MACHINE FOR PLUCKING POULTRY AND THE LIKE

Otis Sandlin, Philadelphia, Pa., assignor to Whistler's Picking Machine Company, Philadelphia, Pa., a copartnership composed of Frances Emma Sandlin and Otis Sandlin Application November 23, 1940, Serial No. 366,828

8 Claims. (Cl. 17—11.1)

The invention relates to machines for plucking or picking poultry and is especially directed to a machine of novel construction by which removal of the feathers is accomplished with great rapidity and thoroughness without bruising, abrading or otherwise damaging either the meat or the skin.

Machines have heretofore been suggested for like purposes but so far as I am aware none of them is commercially satisfactory for the reasons, among others, that they either bruise or abrade the meat and/or skin and thus render the carcasses too unsightly and unattractive for marketing as first grade poultry or they are ineffective to completely remove the feathers, especially the "pin" feathers, and thus do not result in a net saving of labor sufficient to justify their use. Moreover, such machines either wholly destroy or seriously damage the "bloom" on the skin and thus give it the appearance of having been severely scalded or at least roughly handled during preparation of the carcasses for market, with resultant impairment of their salability.

It is therefore a principal object of the invention to provide mechanical means whereby the feathers may be rapidly and completely removed from poultry without damaging the carcasses in any way while preserving the "bloom" on the surface of the skin and giving it the same appearance as that of poultry carefully plucked by hand and without scalding.

A further object is to provide mechanical means for quickly and rapidly plucking poultry whereby the feathers, including the pin feathers, can be easily and satisfactorily removed by merely holding the carcasses in position for the machine to operate upon them, whereby relatively unskilled labor can be employed for the plucking and the expert hand pluckers heretofore required released for other duties.

A still further object is the provision of improved feather removing elements adapted for incorporation in a suitable plucking machine and which by their construction are possessed of an inherent capacity for effective use in plucking poultry, requiring only that a plurality of them be properly associated with suitable operating mechanism to enable them to be efficiently utilized for their intended purpose.

Other objects, purposes and advantages of the invention will hereinafter more fully appear or will be understood from the following description of one embodiment of it illustrated in the accompanying drawing in which Fig. 1 is a diagrammatic side elevation of the plucking machine as a whole;

In the several figures like characters are used to designate the same parts.

Figure 1:
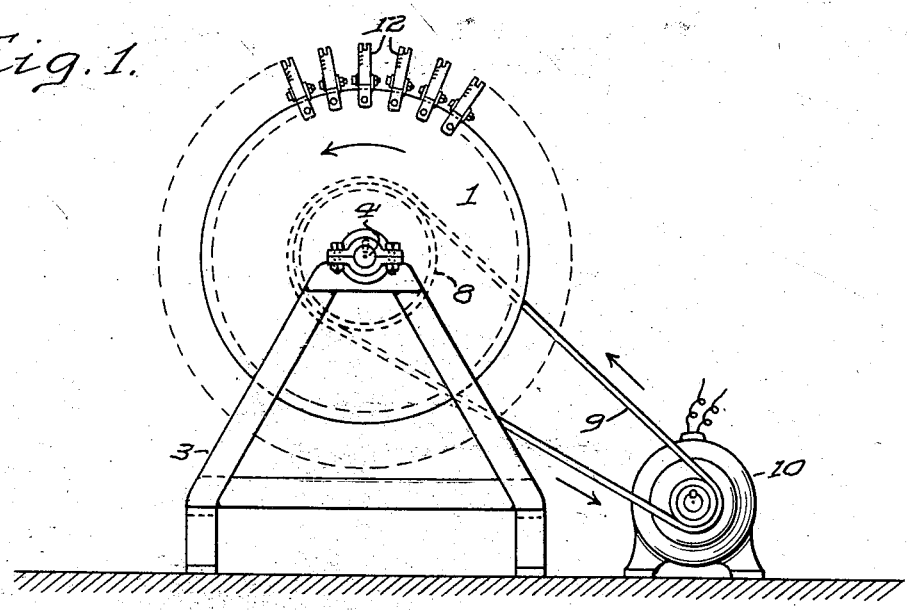

Referring now more particularly to the drawing, the machine diagrammatically illustrated therein is eminently suitable for commercial use in realizing the purposes and objects of the invention and has therefore been selected to conveniently exemplify the latter but it will be understood that other means than those shown may be utilized for supporting and actuating the plucking elements or studs which actually contact the feathers of the fowls and perform the plucking operation, and that utilization of such other means for supporting and actuating them is expressly contemplated by the invention.

The aforesaid machine comprises in general a substantially cylindrical "squirrel cage type" drum 1 formed by a pair of circular end plates 2 which are mounted for rotation in a frame 3 on a shaft 4 and are held in axially spaced assembled relation at the opposite ends of a plurality of circumferentially spaced peripheral ribs 5 by bolts or rivets 6. The ribs 5 are preferably formed from angle bars with radially extending flanges 7 which project outwardly in the area between the plates and cut off ends which allow the ribs to be bent over at right angles for attachment to the plates 2 by the rivets 6. A pulley 8 on the axle receives a belt 9 passing over a smaller pulley on the shaft of motor 10 whereby the drum can be rotated at a suitable speed, preferably approximately 100 R. P. M. when a drum about 30" in diameter is employed. Of course, drums of other sizes may be used and their respective rates of rotation adjusted accordingly and I have found that excellent results are attained when the machines are operated in such a way as to move the outer ends of the plucking studs 12, hereinafter more fully described, at a speed of approximately 900 to 1,000 feet per minute.

These studs 12, which constitute the plucking or feather removing elements to which reference has been made, are preferably formed from pure gum rubber stock, such as pieces of strip stock of rectangular cross-section and about one inch square cut into suitable lengths. Three inch lengths of this stock are well adapted for making the studs and after being cut each length is provided near one end with a hole for the passage of a bolt 13, cooperative with a washer 14 and nut 15 for securing the stud in the machine, while a transverse slot 18 is formed in the other end of the stud and a plurality of slits 19 are cut into a front face 20 at an acute angle inclined inwardly toward said other end as most clearly shown in Fig. 2. The slots 18 and slits 19 in the studs may be produced with a saw or other instrument leaving a more or less roughened edge which is of advantage as it apparently enhances their effectiveness in plucking feathers when the stud is in operation particularly in the case of the outer edges of the slits 19 which are relatively sharp as a result of the angularity of the slits to the front faces of the studs.

Figure 3:
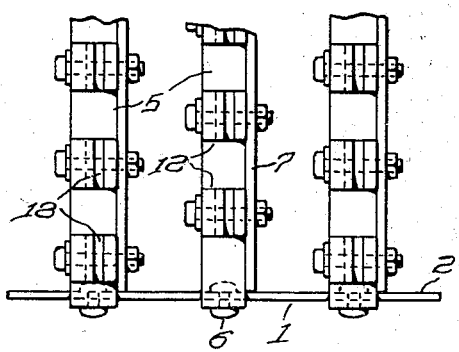
Fig. 3 is a planar development of a portion of the machine on a similarly enlarged scale.
Figure 4:
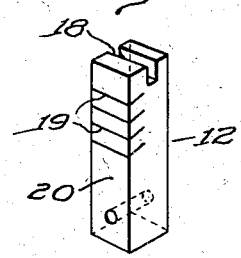
Fig. 4 is a perspective view of one of the plucking elements or studs removed from the machine.

A plurality of similar studs 12, mounted on each of the ribs 5 of the machine through the medium of bolts 13, washers 14 and nuts 15, thus project radially from the drum at intervals spaced along the ribs distances about equal to the thickness of a single stud, while the several studs on each rib are preferably staggered or axially offset at substantially like intervals with relation to those on adjacent ribs as indicated in Fig. 3 so that when the drum is rotated the studs on alternate ribs follow each other, or "track" in paths which adjoin, or even slightly overlap the paths of the studs on the intervening ribs.

Figure 2:
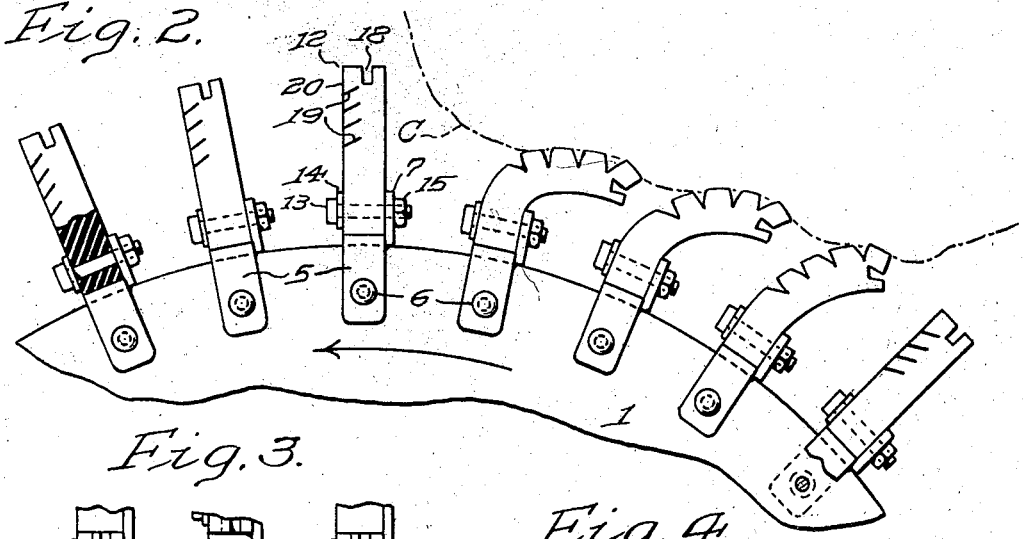
Fig. 2 is a fragmentary side elevation on a greatly enlarged scale illustrating the machine in operation.

Consequently when a carcass of a fowl, indicated at C in Fig. 2, is brought against the rotating drum and moved about in engagement with the studs, there are no voids between the parts attacked by adjacent rows, and every part of the carcass can therefore be quickly and effectively subjected to the plucking action of the studs.

This action occurs most smoothly when the studs are kept wet, as with the residual moisture carried to them by the carcasses which are preferably immersed in water at about 120° F. on their way to the machine, and is probably performed mainly by the acute more or less roughened edges presented by the slots 18 and slits 19 in the studs as the latter are brought into play for plucking poultry in the manner to be hereinafter more fully described. The roughness of these edges is apparently retained indefinitely under normal conditions of use, for even after a period of several months of substantially continuous daily operation in plucking poultry the studs reveal little or no evidence of material wear or other deterioration.

When the machine is in operation with the drum rotating counter-clockwise as viewed in Fig. 1, it is usually most convenient for the operator to stand at the right hand side of the machine in said figure with the motor 10 thus on the floor at his right, and by having the semi-scalded fowl carcasses delivered to him successively at his left by a conveyor (not shown), which first carries them through the hot (120° F.) water, he can readily bring each against the periphery of the rotating drum in a manner to forcibly contact it in quick succession with several of the rapidly moving studs 12. As the latter are bent inwardly and rearwardly when the carcass bears against them in the manner indicated at the right hand side of Fig. 2, the edges formed by the slits 19, and later, the edges of slots 18 frictionally engage and quickly and effectively remove the feathers; the operator thus has merely to turn the carcass to expose all parts of it to the action of the studs to rapidly and easily complete the plucking operation.

As the studs successively move out of contact with the carcass after having been bent rearwardly by pressure of the latter, each carries some of the feathers with it until its inherent resiliency restores it to its normal radial position, usually with a sudden snap which catapults the feathers outwardly from the drum and prevents the studs from becoming clogged therewith.

The staggered relation of the studs on the drum and the speed at which it is preferably operated enable every portion of the carcass to be exposed to engagement by a large number of the studs in rapid succession with the result that all the feathers are cleanly and quickly plucked in a minimum of time and with very little effort on the part of the operator. In fact a single operator without any particular special training in the operation or use of the machine can pluck as many carcasses in a given time as two or even more of the most expert pluckers can pluck in any other way in the same period of time; a machine equipped with my novel studs, moreover, enables poultry to be plucked much more cleanly, with substantially complete removal of the "pin" feathers and with less damage either through bruising or abrading of the skin or removal of "bloom" therefrom than by other methods or with other plucking aids with which I am familiar, while it is so much more rapid than the extremely careful hand plucking necessary to produce dressed poultry of comparable appearance as to "bloom", bruises, abrasions and the like that a comparison by figures would appear exaggerated. It may be noted, however, that in one plant in which my machines have been used, their introduction has enabled a crew of eighteen men to prepare for market five thousand fowl per day whereas prior to the introduction of the machines forty men were required to attain this production rate.

While I have herein described one embodiment of the invention with considerable particularity, especially as embodied in a machine of the rotating drum type, it will be understood I do not desire or intend thereby to limit or confine the invention thereto in any way, as changes and modifications in its form, construction, and arrangement as well as in many other respects will readily occur to those skilled in the art and may be made if desired without departing from the spirit and scope of the invention as defined in the appended claims.

Having thus described my invention, I claim and desire to protect by Letters Patent of the United States:

1. A poultry plucking machine of the character described comprising a plurality of elongated resilient studs disposed in laterally spaced relation in a plurality of spaced rows relatively offset longitudinally with respect to each other and movable as a unit, and movable supporting means for the studs, each stud having a front face interrupted by a plurality of transverse slits forming edges adapted to engage a feathered carcass when the stud is bent thereby.

2. A poultry plucking machine of the character described comprising a rotatable drum and a plurality of flexible studs projecting radially from the drum each having a plurality of angular slits across one face and a slot across its radially outer end substantially paralleling the drum axis.

3. A poultry plucking machine of the character described comprising a rotatable drum, a plurality of resilient studs of substantially rectangular cross-section projecting radially from the drum in circumferentially staggered relation each presenting for contact with a fowl carcass a front face and a plurality of edges substantially paralleling the drum axis and defined by the intersections with said front face of angularly directed slits the sides of which progressively diverge when the stud is bent circumferentially rearwardly during said contact.

4. A feather engaging stud for a poultry plucking machine comprising a resilient body having a flat front face interrupted by a plurality of transverse slits and a slot extending across the end of the body.

5. A feather engaging stud for a poultry plucking machine consisting of a length of rubber stock of substantially rectangular cross-section having it front face interrupted to present a plurality of substantially rectilinear edges defined by the intersections of angular slits with the front face adapted for engagement with a feathered carcass when the stud is bent rearwardly from said face by said carcass.

6. A feather engaging stud for a poultry plucking machine consisting of a length of rubber stock of substantially rectangular cross-section having a series of transverse cuts in one lateral face in spaced relation to each other longitudinally of the stud, each cut lying at an acute angle to said face with its outer edge more nearly adjacent the base of the stud than its inner edge.

7. A feather engaging stud consisting of a length of a rubber stock of substantially rectangular cross-section having a slot extending across one end and a series of transverse cuts in one lateral face in spaced relation to each other longitudinally of the stud, each cut lying at an acute angle to said face with its inner edge more nearly adjacent the aforesaid end of the stud than its outer edge.

8. A poultry plucking machine of the character described, comprising a plurality of elongated resilient studs disposed in laterally spaced relation in a plurality of spaced rows and movable as a unit, and movable supporting means for the studs, each stud having a front face defined by a plane surface and a plurality of transverse interruptions in said surface forming sharp plucking edges when the stud is bent.

OTIS SANDLIN.